United States Patent

Ikeda et al.

[11] Patent Number: 6,162,356
[45] Date of Patent: Dec. 19, 2000

[54] CHIP FOR USE IN NUCLEIC ACID SEPARATION, STRUCTURAL ELEMENT AND PROCESS FOR FORMING THE STRUCTURAL ELEMENT

[75] Inventors: Yukiko Ikeda, Ibaraki-ken; Yoshishige Endo, Tsuchiura; Yasuhiro Yoshimura, Ibaraki-ken; Takao Terayama, Ushiku; Kenji Yasuda, Tokyo; Toshinari Sakurai, Hitachinaka; Tetsuo Yokoyama, Tokyo; Takanori Aono, Ibaraki-ken, all of Japan

[73] Assignee: Hitachi, Ltd., Tokyo, Japan

[21] Appl. No.: 09/272,353

[22] Filed: Mar. 19, 1999

[30] Foreign Application Priority Data

Mar. 19, 1998 [JP] Japan ................................ 10-069787

[51] Int. Cl.⁷ ................................................ B01D 15/08
[52] U.S. Cl. .................................... 210/198.2; 210/502.1; 210/510.1
[58] Field of Search .................................... 210/635, 656, 210/658, 198.2, 502.1, 510.1; 95/82, 88; 96/101

[56] References Cited

U.S. PATENT DOCUMENTS

| | | | |
|---|---|---|---|
| 1,669,362 | 5/1928 | Watson | 210/510.1 |
| 3,048,537 | 8/1962 | Pall | 210/510.1 |
| 4,863,592 | 9/1989 | Allington | 210/510.1 |
| 5,064,534 | 11/1991 | Busch | 210/510.1 |
| 5,135,649 | 8/1992 | Kanda | 210/198.2 |
| 5,145,806 | 9/1992 | Shirakawa | 210/510.1 |
| 5,268,097 | 12/1993 | Girot | 210/198.2 |
| 5,360,544 | 11/1994 | Nakaso | 210/510.1 |
| 5,645,723 | 7/1997 | Fujishiro et al. | 210/321.75 |
| 5,738,783 | 4/1998 | Shirota | 210/198.2 |
| 5,997,746 | 12/1999 | Valaskovic | 210/198.2 |
| 6,063,283 | 5/2000 | Shirota | 210/198.2 |

FOREIGN PATENT DOCUMENTS

| | | | |
|---|---|---|---|
| 0268946 | 6/1988 | European Pat. Off. | 210/198.2 |
| 9-47278 | 2/1997 | Japan | 210/198.2 |

OTHER PUBLICATIONS

Patent Abstracts of Japan, vol. 009, No. 104 (C–279), May 8, 1985 & JP 59 230605.
Patent Abstracts of Japan, vol. 014, No. 171 (C–0706), Apr. 3, 1990 & JP 02 022120.
Patent Abstracts of Japan, vol. 013, No. 124 (C–580), Mar. 27, 1989 & JP 63 295444.
Patent Abstracts of Japan, vol. 014, No. 377 (C–0748), Aug. 15, 1990 & JP 02 137715.

*Primary Examiner*—Ernest G. Therkorn
*Attorney, Agent, or Firm*—Antonelli, Terry, Stout & Kraus, LLP

[57] ABSTRACT

Composite particles formed from resin particles and silica particles (amount of silica particles: 0.2 to 10 wt. % on the basis of the resin particles) in an apparatus for formation of composite particles are placed in a PTFE mold and heat treated to weld the resin particles to one another, thereby forming a structural element, which is dipped in an ethyl silicate solution containing monodispersed silica particles, then taken out of the solution and subjected to further heat treatment to form an ultimate structural element, which is sealed in a tip case, whereby a tip can be produced at a low cost and used to separate nucleic acid from a liquid sample for a short time at a high recovery rate without any defects such as breaking, etc.

5 Claims, 8 Drawing Sheets

ENLARGED VIEW

FIG. 8B

ENLARGED VIEW

CHIP FOR USE IN NUCLEIC ACID SEPARATION, STRUCTURAL ELEMENT AND PROCESS FOR FORMING THE STRUCTURAL ELEMENT

BACKGROUND OF THE INVENTION

1). Field of the Invention

The present invention relates to a tip for trapping nucleic acid capable of separating a nucleic acid component or plasmid DNA from a nucleic acid-containing sample such as a vital sample, a structural element encased in the tip and a process for forming the structural element.

2). Related Art

The conventional process for separating nucleic acid from a vital sample, etc. containing nucleic acid includes, for example, a process comprising at first allowing a surfactant to act upon a vital sample, etc. in the presence of protease, thereby liberating nucleic acid and then mixing the sample with phenol (and chloroform), followed by several runs of centrifugal separation of the mixture into an aqueous layer and an organic layer and recovery of nucleic acid in the form of sediments from the aqueous layer, and a column chromatographic process using a structural element comprising a specific single species of particles such as silicon oxide, etc. filled in a column. To simplify these processes, various attempts to improve the processes and apparatuses have been so far made.

JP-A-9-47278 discloses a process and an apparatus for DNA extraction and purification capable of extracting DNA from a culture solution at a low cost in a fully automatic manner, where the tip for the apparatus is in a vertical double structure of a first filter tube comprising a trap filler and a membrane filter and a second filter tube comprising a glass fiber filter, a glass powder layer and a membrane filter, and DNA extraction is carried out by a series of removal of impurities by filtration, DNA adsorption, washing and elution, using a vacuum means (pump).

Centrifugal separation of nucleic acid inevitably makes the scale of the apparatus larger and still involves a problem of damaging of nucleic acid per se due to the high speed revolution.

In case of filling a specific single species of particles in a column as in the column chromatography or in the tip of the above-mentioned reference, the particles take a closest packed structure due to the nature of fine particles (particularly when the particle sizes are uniform), or in case that there is some particle size distribution, smaller particles gather and enter between larger particles to form a compact state, thereby deteriorating the liquid passage therethrough, consequently requiring much time for the sample passage. When a vacuum pump is used to shorten the sample passage time in the separation, the same problem as in the centrifugal separation, i.e. breaking of nucleic acid, is encountered.

BRIEF SUMMARY OF THE INVENTION

An object of the present invention is to solve the foregoing problems and provide a structural element capable of separating nucleic acid from a liquid sample, e.g. a vital sample without any defects such as breaking, etc., but with easy passage of the liquid sample there-through unnecessitating the use of a vacuum pump, and also a tip provided in its liquid passage with the structural element and a process for forming the structural element and also a process for producing the tip.

The object of the present invention can be attained by a tip provided in its liquid passage with a structural element which comprises a silicon oxide material, preferably silicon oxide particles or film and has pores of larger pore sizes than particle sizes of the silicon oxide particles or by a tip provided in its liquid passage with a structural element formed from composite particles comprising resin particles as nuclei and silicon oxide particles deposited on the surfaces of the resin particles by three-dimensionably bonding the composite particles to one another.

It is well known that nucleic acid can be adsorbed on silicon oxide such as silica or glass. So called silica ($SiO_2$) generally has many modifications, principably such three modifications as quartz, tridymite and cristobalite, each of which can be further classified into a high temperature type and a low temperature type. Quartz is not a salt, but sometimes is classified into silicate minerals from the viewpoint of condensation form. Ordinary glass is an amorphous condensed silicic acid, which is stabilized by incorporation of alkali metal ions or alkaline earth metal ions into its three-dimensional, irregular reticular structure. The silica also includes synthetic formed by hydrolysis and dehydration condensation of silicon with an alkoxide compound. In the present specification, all these silica, glass, silicates, silicate minerals and condensed silicic acid, irrespective of their crystallinity or non-crystallity, will be hereinafter referred to as "a silicon oxide".

"Structural element" herein referred to has a suitable size for insertion into the tip for DNA adsorption.

Nucleic acid, when passing through the structural element provided in the tip, is trapped by the silicon oxide sites on the surfaces of paths through the structural element. In the present invention, the structural element is composed of three-dimensionally bonded particles and thus has paths for liquid passage as pores. In other words, the present structural element has a good liquid passage and can undergo suction and discharge of a sample liquid without using any specific vacuum system for the suction.

Such a structural element for trapping nucleic acid can be formed by a step of mixing silicon oxide particles, resin particles having larger particle sizes than those of the silicon oxide particles, thereby depositing the silicon oxide particles onto the surfaces of the resin particles to form composite particles, a step of placing the composite particles into a mold and heat treating the composite particles as in the mold at the heat-resisting temperature of the resin particles or higher or the welding temperature of the resin particles, thereby welding the resin particles to one another to form a structural element and/or a step of dipping the structural element taken out of the mold or a porous material into a sol-gel solution containing a silicon compound, and a step of taking the dipped structural element or porous material out of the sol-gel solution, followed by heat treatment, thereby polycondensing the sol-gel solution entrained therein.

Alternatively, the structural element for trapping nucleic acid can be formed by a step of depositing silicon oxide particles onto the surfaces of resin particles having larger particle sizes than those of the silicon oxide particles to form composite particles, a step of mixing the composite particles and a sol-gel solution containing a silicon compound and placing the resulting mixture into a mold, and a step of heat treating the mixture as in the mold at the heat-resisting temperature of the resin particles or higher, thereby polycondensing the sol-gel solution and converting the mixture to a formed product, and taking out the formed product out of the mold.

DETAILED DESCRIPTION OF THE INVENTION

Figure 1:
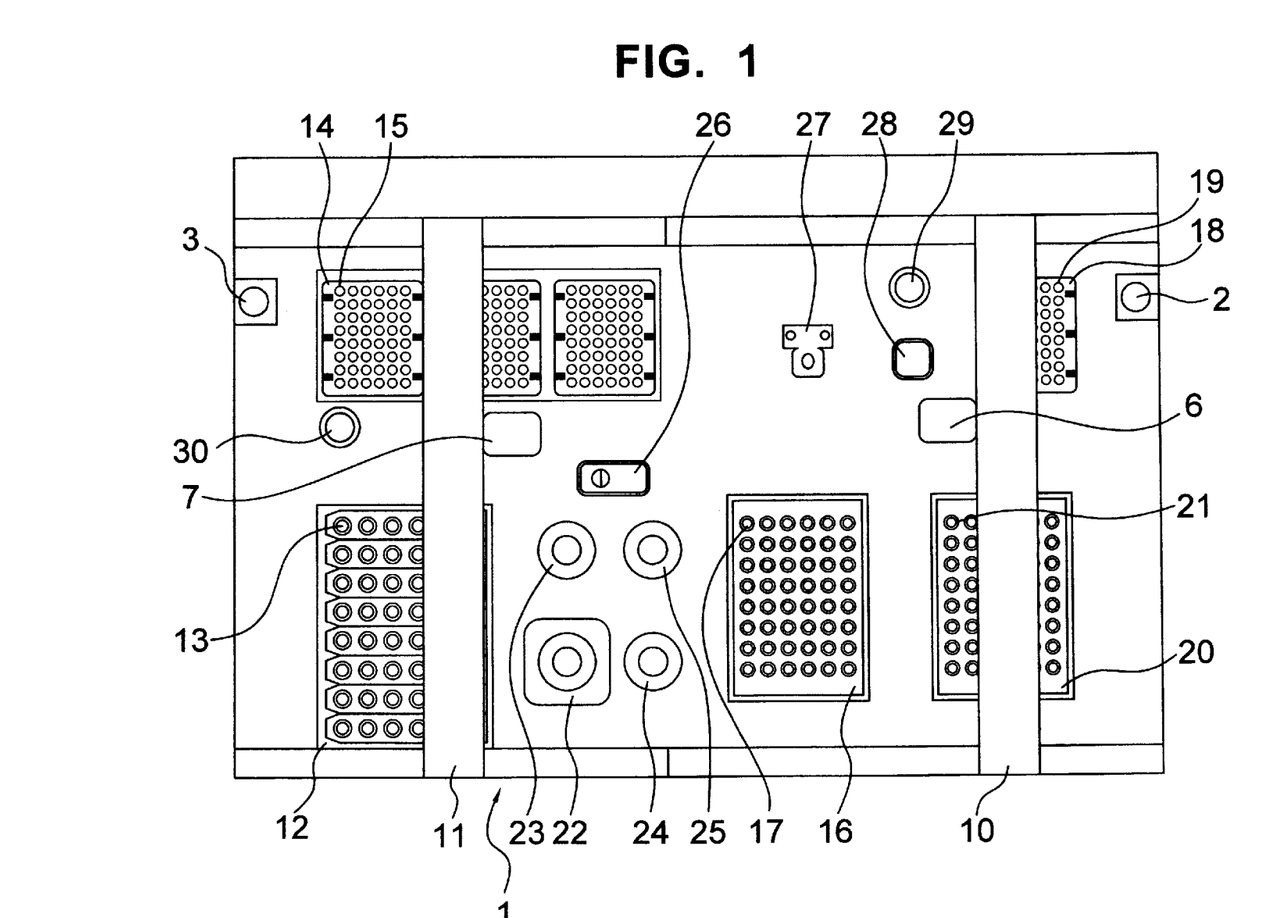
FIG. 1 is a plan view of a sample preparation apparatus for genetic diagnostics.

The present tip for trapping nucleic acid is used in nucleic acid extraction in a sample preparation apparatus of separating nucleic acid from a nucleic acid-containing sample liquid such as a vital sample, etc. to obtain genetic information from nucleic acid in the field of clinical investigation and research. In the sample preparation apparatus for genetic investigation, nucleic acid extraction is carried out by the following procedures. FIG. 1 is a structural plan view of the apparatus and FIG. 2 shows the flow route in the nucleic acid separation.

Figure 2:
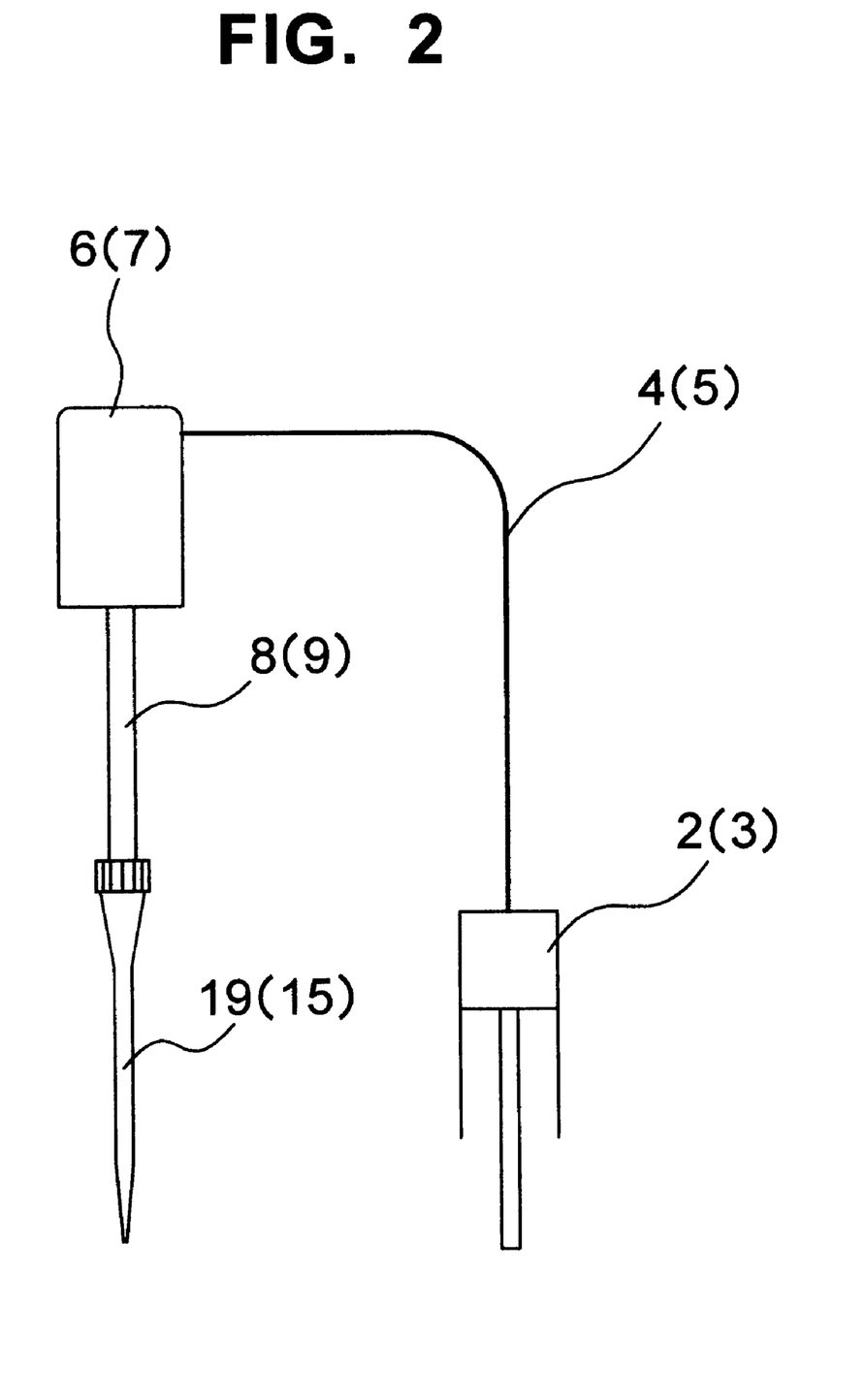
FIG. 2 is a schematic view of flow route in the nucleic acid separation section.

In FIG. 2, the sections through which a sample liquid, washing solution, etc., can pass by suction or discharging, as will be described later, are called "tips 19 and 15", respectively, which are independently connected to corresponding syringes 2 and 3 through, nozzles 8 and 9, nozzle holders 6 and 7 and pipings 4 and 5, respectively. Among the tips, the tip provided with a structural element for trapping nucleic acid (not shown in the drawing) therein will be hereinafter referred to as "separator tip 19". The tips are tapered on the inside periphery at the tip end, and the structural element for trapping nucleic acid from a liquid sample is provided in the separator tip 19 at the tapered chip end. The chip for use to dispense various liquid reagents, etc. is not provided with such a structural element therein. To differentiate the tip without such a structural element therein from the separator tip 19 with the structural element therein. The former will be hereinafter referred to "dispenser tip 15".

Structure of the apparatus will be described in detail below.

Syringes 2 and 3 independently can perform automatic control of suction and discharge of a liquid sample. Syringes 2 and 3 independently are connected to nozzles 8 and 9 through pipings 4 and 5, respectively. The nozzles 8 and 9 are fixed to nozzle holders 6 and 7, respectively. As shown in FIG. 1, the nozzle holders 6 and 7 are kept movable in both X axis and Z axis directions by arms 10 and 11, respectively. The arms 10 and 11 independently are movable in the X axis direction, and can be partly overlapped in the X axis direction by giving a difference in the Z axis direction. By combination of motions of nozzle holders 6 and 7 with those of arms 10 and 11, tips 15 and 19 to the principal points along the apparatus surface can be controlled.

Dispenser tip rack 14 can hold a plurality of dispenser tips 15 thereon, and the apparatus can be provided with total three dispenser tip racks. Reactor vessel rack 16 can hold 48 reactor vessels 17. Purified product rack 20 can hold 48 purified product storage vessels 21. Furthermore, the apparatus can hold a washing solution bottle 22, an eluate bottle 23, a dilution bottle 24 and a bonding promoter bottle 25. Tip rack 18 can hold 48 separator tips 19.

Principal working of the apparatus will be described below.

At first, by controlling the arm 11 and the nozzle holder 7, the nozzle 9 is made to move to the overhead position of a specific dispenser tip 15 on the dispenser tip rack 14. Then, the nozzle holder 7 is made to move downwards, thereby allowing the nozzle 9 to come in contact with the desired position of the dispenser tip 15 and automatically fixing the dispenser tip 15 to the tip end of the nozzle 9. By controlling the nozzle 8, the nozzle holder 6 and the arm 10 likewise, a separator tip 19 can be fixed to the chip end of the nozzle 8.

By controlling the arm 11 and the nozzle holder 7, the nozzle 9 is made to move to the overhead position of but just before a tip remover 27, and then by controlling the nozzle holder 7, the joint part of the nozzle 9 and the dispenser tip 15 is made to move to the lower position than the tip remover 27. The nozzle 9 is made to further move toward the tip remover 27 and then nozzle holder 7 is made to move upwards, while keeping part of the nozzle 9 in contact with the tip remover 27, whereby the dispenser tip 15 can be automatically removed from the nozzle 9. By controlling the nozzle 8, the nozzle holder 6 and the arm 10 likewise, the separator tip 19 can be removed from the nozzle 8.

Liquid receptacles 29 and 30 can receive discharge liquids from nozzles 8 and 9 and act as nozzle home positions, and the received liquids are sent as waste liquids to a waste liquid treatment process not shown in the drawing. washing section 26 is to wash the dispenser tip 15 fixed to the nozzle holder 7 through the nozzle 9 with flowing water.

Recovery of DNA added to serum, using the automatic apparatus, will be described in detail below:

Human serum admixed with a commercially available purified product of λ DNA (made by Fermentas Co.) and further with SDS (sodium dodecylsulfate) at an ultimate concentration of 1% as measures against nuclease is stored in a sample bottle as sample liquid 13 (liquid sample), and the sample bottle is placed, on the sample rack 12 in the apparatus. Dispenser tip rack 18, reagent bottles 22, 23, 24 and 25, reactor vessels 17 and purified product storage vessels 21 are set to the predetermined positions, respectively, in the apparatus, and then the apparatus is operated as follows:

At first, the first step is to mix a liquid sample 13 with a bonding promoter by a dispenser tip 15.

By controlling the arm 11 and the nozzle holder 7, the dispenser tip 15 is fixed to the nozzle 9 through predetermined motions. Then, by controlling the arm 11, the nozzle holder 7 and the syringe 3, a predetermined amount of guanidine hydrochloride as a bonding promoter is sucked into the dispenser tip 15 from a bonding promoter bottle 25. After further suction of 50 μl of air, the nozzle 9 and the dispenser tip 15 are made to move to the washing section 26 by controlling, where the outer wall of the dispenser tip is washed with flowing water. After the washing the nozzle holder 7 is made to move to the position of a specific sample liquid 13 on the sample rack 12 by controlling and a predetermined amount of the sample liquid 13 is sucked into the dispenser tip 15 by controlling the syringe 3. After the suction, nozzle holder 7 is made to move to a specific reactor vessel 17 on the reactor vessel rack 16 by controlling, and then the whole amount is discharged from the dispenser tip 15. After the discharging, the sample liquid 13 and quanidine hydrochloride are mixed together by further suction and discharging. After the mixing, the nozzle holder 7 is made to move to the position of a tip remover 27 by controlling, and the dispenser tip 15 is disengaged from the nozzle 9 by predetermined motions.

The second step is to bond nucleic acid (DNA in this case) to the structural element for trapping nucleic acid provided in the tip 19.

By controlling the arm 10 and the nozzle holder 6, a separator tip 19 is fixed to the nozzle 8 by predetermined motions. Then, the nozzle holder 6 is made to move to the liquid mixture-containing reactor vessel 17 on the reactor vessel rack 16, and the liquid mixture is sucked into the separator tip 19 by controlling the syringe 2. After the suction, suction and discharge of the liquid mixture are repeated by predetermined run by controlling the syringe 2 to allow the liquid mixture to come in contact with the structural element.

The third step is to discharge the residual liquid after the trapping of nucleic acid by the structural element.

After the separator tip 19 is subjected to repetitions of predetermined runs of suction and discharge of the liquid mixture, the liquid mixture in the reactor vessel 17 is sucked into the separator tip 19. Then, the separator tip 19 is made to move to the liquid waste outlet 28 by controlling the arm 10 and the nozzle holder 6, and the liquid mixture in the separator tip 19 and the nozzle 8 is discharged therefrom by controlling the syringe 2. After the discharging, the separator tip 19 is made to move to the liquid receptacle 29 by controlling the arm 10 and the nozzle holder 6.

The fourth step is to wash the nucleic acid-trapped structural element in the separator tip 19.

A dispenser tip 15 is fixed to the nozzle 9 by controlling the arm 11 and the nozzle holder 7. Then, a predetermined amount of a washing liquid is sucked into the dispenser tip 15 from the washing bottle 22 by controlling the arm 11, the nozzle holder 7 and the syringe 3. Then, the nozzle holder 7 is made to move to a specific reactor vessel 17 on the reactor vessel rack 16 to discharge the washing liquid. After the discharging, the nozzle holder 7 is made to move to the position of the tip remover 27 by controlling the arm 11 and the nozzle holder 7, and the dispenser tip 15 is disengaged from the nozzle 9 by predetermined motions.

After the movement of nozzle holder 7 from the position of the tip remover 27, the separator chip 19 is made to move to the washing liquid-containing reactor vessel 17 on the reactor vessel rack 16, and the washing liquid is sucked into the separator tip 19 by controlling the syringe 2. After the suction, the separator tip 19 is subjected to repetitions of predetermined runs of suction and discharge of the washing liquid by controlling the syringe 2 to wash the nucleic acid-trapped structural element with the washing liquid. After the repetitions of predetermined runs of suction and discharge, the separator tip 19 is made to move to waste liquid outlet 28 by controlling the arm 10 and the nozzle holder 6, and the washing liquid in the separator tip 19 is discharged by controlling the syringe 2. After the discharge, the separator tip 19 is made to move to the liquid receptacle 29 by controlling the arm 10 and the nozzle holder 6. The fourth step can be repeated by predetermined runs, if required.

The fifth step is to elute nucleic acid trapped on the structural element in the separator tip 19.

A dispenser chip 15 is fixed to the nozzle 9 by predetermined motions by controlling the arm 11 and the nozzle holder 7. Then, an eluate is sucked into the dispenser tip 15 from an eluate bottle 23 by controlling the arm 11, the nozzle holder and the syringe 3, and the nozzle holder 7 is made to move to a specific reactor vessel 17 on the reactor vessel rack 16 by controlling. Then, the eluate in the dispenser tip 15 is discharged into the reactor vessel 17. After the discharging, the nozzle holder 7 is made to move to the position of the tip remover 27 by controlling the arm 11 and the nozzle holder 7 and the dispenser tip 15 is disengaged from the nozzle 9 by predetermined motions.

After the movement of the nozzle holder 7 from the position of the tip remover 27, a separator chip 19 is made to move to the eluate-containing specific reactor vessel 17 on the reactor vessel rack 16 by controlling the arm 10 and the nozzle holder 6, where the eluate is sucked into the separator tip 19 from the reactor vessel 17 by controlling the syringe 2. After the suction, predetermined runs of suction and discharging are repeated by controlling the syringe 2 to allow the structural element to come in contact with the eluate. Then, while holding the eluate sucked from the reactor vessel 17 in the separator tip 19, the separator tip 19 is made to move to a specific purified product storage vessel 21 by controlling the arm 10 and the nozzle holder 10. After the movement, the eluate in the separator tip 19 is discharged into the purified product storage vessel 21 by controlling the syringe 2. After the discharge, the separator tip 19 is moved to the liquid receptacle 29 by controlling the arm 10 and the nozzle holder 6. The fifth step can be repeated by predetermined runs, if required.

After the fifth step, the nozzle holder 6 is made to move to the position of the tip remover 27 by controlling the arm 10 and the nozzle holder 6 and the separator tip 19 is disengaged from the nozzle 8 by predetermined motions.

The present invention will be described below, referring to the following Examples showing a process for forming a structural element for trapping nucleic acid, a process for producing a tip and test results of nucleic acid trapping.

EXAMPLE 1

A process for forming a structural element for trapping nucleic acid, provided in a separator tip, according to a first embodiment of the present invention will be described below.

Figure 3A:
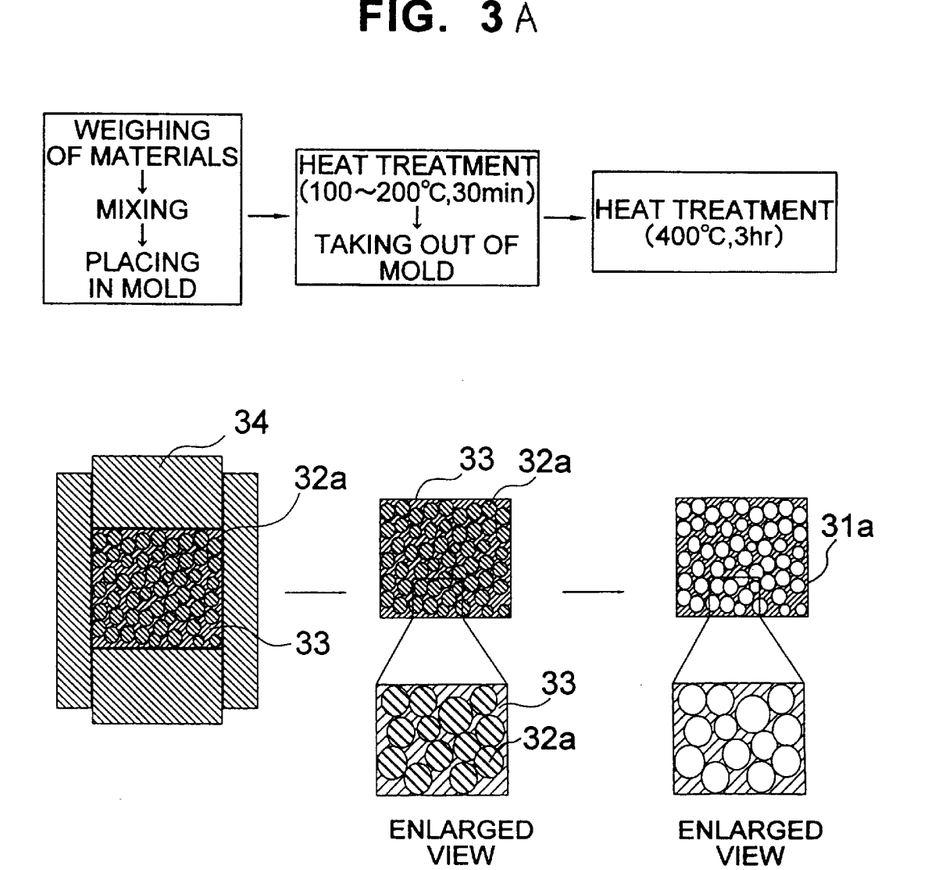
FIG. 3A shows one series of steps for forming a structural element.

FIG. 3A shows process steps for the formation.

① Silica particles[1] and resin particles 32a[2] as organic materials are weighed out to make a resin particle volume concentration of 10 to 60 vol. % on the basis of silica particles in terms of specific gravity. Then, a predetermined amount of an ethyl silicate solution[3] is added thereto, and the resulting mixture is stirred until it turns a clay-like mixture and placed into a mold 34 made from PTFE (polytetrafluoroethylene). In FIG. 3A, numeral 33 shows a mixture of the silica particles and the ethyl silicate solution.

② The mixture in the PTFE mold 34 is heat treated at 100°–200° C. for 30 minutes to polycondense ethyl silicate in the mold 34, whereby the resulting formed product, which is not disintegratable even when taken out of the mold 34, can be obtained.

③ The formed product taken out of the mold 34 is heat treated at least at 400° C. for 3 hours to completely combust the resin particles 32a, whereby the resin particles 32a- occupied sites turn to pores to form a structural element 31 having paths therethrough. The pores that have been formed at place of resin particles 32 have fine projections of silica particles protruded from the inside pore walls, though not shown in FIG. 3A, resulting in increase in the contact area with a liquid sample and facilitation to trap nucleic acid.

In the foregoing description, *1 means silica particles APPROX (trademark of a product made by Sigma Chemical Co., particle sizes: 8–10 $\mu$m), *2 means polyethylene resin particles CL series (trademark of products made by Sumitomo Seika Chemicals Co., Ltd., particle sizes: 180–1,000 $\mu$m) and *3 means an ethyl silicate solution (a sol-gel solution containing a silicon compound, i.e. a silicon alkoxide solution in alcohol, prepared from 25 parts by weight of ethyl silicate, 17.28 parts by weight of water, 0.3 parts by weight of 12 N hydrochloric acid and 5.42 parts by weight of ethanol.

In this process, the silica particles and the resin particles 32a are not limited to the above-mentioned products. Furthermore, the ethyl silicate concentration can be changed. It is desirable that the silicon oxide particles to be used have particle sizes of 0.001 to 100 $\mu$m, preferably 0.001 to 20 $\mu$m. Below 0.001 $\mu$m, scattering during the weighing, unstable concentration and generation of dust during the handling are encountered as problems, whereas above 100 $\mu$m distances between the path-forming organic materials are increased, and the resulting structural element is liable to disintegrate.

When the organic materials are resin particles 32a as in this Example, it is desirable that their particle sizes are 50 to 1,000 $\mu$m. Below 50 $\mu$m, a liquid flow-ability is so poor that there is a pressure buildup at the liquid suction or discharge, resulting in a high possibility to break nucleic acid. Above 1,000 $\mu$m the resulting pores are too large to form a structural element, or the structural element, even if formed, will disintegrate.

The ethyl silicate solution (sol-gel solution containing a silicon compound) acts as a binder to bond the silicon oxide particles) to one another. In this Example, the ethyl silicate solution is used, but various metal solgel solutions may be used as the binder. The binder-occupied sites per se of the sol-gel solution containing a silicon compound can act to bind nucleic acid thereto and thus can contribute to attain a higher nucleic acid trapping efficiency.

The sol-gel solution comprises a silicon alkoxide as the main component and a solution of water (for hydrolysis) and an acid or alkali (as a catalyst) in a solvent (for making a homogeneous solution, usually alcohol in case of using an alkoxide such as aluminum isopropoxide, titanium isopropoxide, etc.). The sol-gel solution is not limited to the foregoing composition, and a carboxylate such as lead acetate, barium oxalate, etc. or an inorganic compound such as yttrium nitrate, titanium chloride, etc. can be used in place of the alkoxide. It is also possible to use ethylene glycol, ethylene oxide, triethanolamine, xylene, etc. as the solvent. If necessary, it is also possible to add thereto an additive to prevent, for example, cracking.

In the present invention, it is desirable to make a volume concentration of resin particles 32a on the basis of silica particles as high as possible, for example, to such a level as not to cause disintegration of the structural element for trapping nucleic acid after the heat treatment, because the volume concentration gives a considerable influence to the flowability of a sample liquid 13 through the resulting structural element. The resin particle volume concentration depends upon particle sizes of resin particles 32a to be used, and it is preferable to lower the volume concentration with increasing structural element size. Furthermore, the specific gravity also differs from particles to particles, so differs the resin particle volume concentration.

Heat treatment in the step ② is directed to forming and thus can be carried out at any temperature from the solidification temperature of the ethyl silicate solution to the melting point of PTFE used as the mold material. Heat treatment must be continued until the solvents (ethanol and water in this Example) are dissipated. Heat treatment in the step ① must be continued until the resin particles 32a are dissipated by combustion. Heat treatment temperature can be changed in some cases, depending upon the species and amount of resin particles 32a to be used, and heat treatment time is also variable, depending upon the species and amount of resin particles 32a.

EXAMPLE 2

Another process for forming a structural element for trapping nucleic acid according to a second embodiment of the present invention will be described below.

Figure 3B:
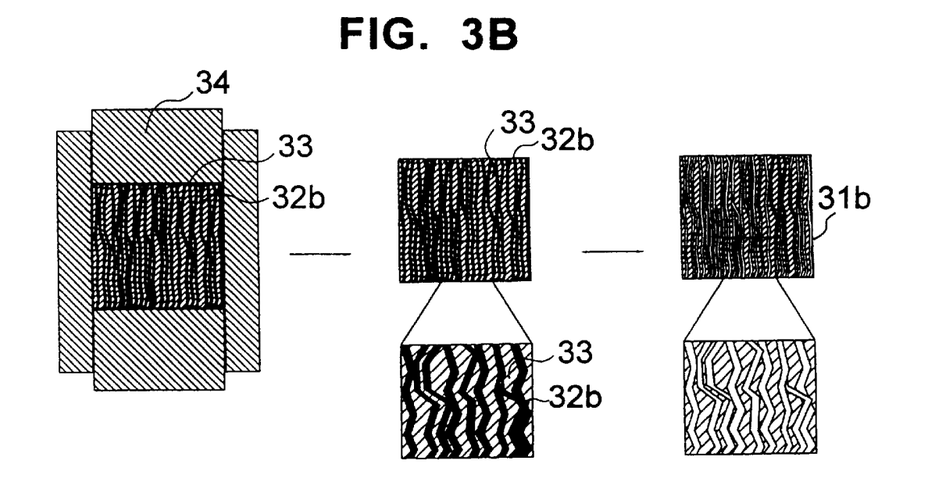
FIG. 3B shows another series of steps for forming a structural element.

FIG. 3B shows process steps for the formation.

① Silica particles and fibers 32b as organic materials are weighed out to make an organic material volume concentration of 10 to 60 vol. % on the basis of silica particles in terms of specific gravity. The fibers 32b are placed into a mold 34 made from PTFE, and then a predetermined amount of a sol-gel solution is added thereto. In FIG. 3B, numeral 33 shows a mixture of silica particles and sol-gel solution.

② The mixture in the PTFE mold 34 is heat treated at a temperature of 100° to 200° C. for 30 minutes to polycondense the ethyl silicate in the mold 34.

③ The formed product taken out of the mold 34 is heat treated at least at 400° C. for 3 hours to completely combust the fibers 32b, whereby the fibers 32b-occupied sites turn to pores to form a structural element 31b having silica particle-deposited paths therethrough.

When fibers 32b are used as organic materials as in this Example, it is desirable to increase the amount of the ethyl silicate solution to be used as a binder, as compared with that in Example 1 using resin particles 32a. Differently from the resin particles 32a, fibers 32b are in a continuously elongated state, and thus it is necessary to increase the amount of the binder to make the structural element 31 much stronger. Specifically, the formed product resulting from the step ② is made to undergo permeation of an appropriate amount of the ethyl silicate solution therein, and then heat treated to polycondense the permeated ethyl silicate. If required, this step is repeated by several runs. Any of synthetic fibers such as rayons, polyesters, acrylic fibers, etc. and natural fibers such as cotton, hemp, flax, jute, silk, etc. or strings thereof can be used as the fibers 32b, and plants such as wood, bamboo, etc. can be used as natural fibers.

EXAMPLE 3

Figure 4:
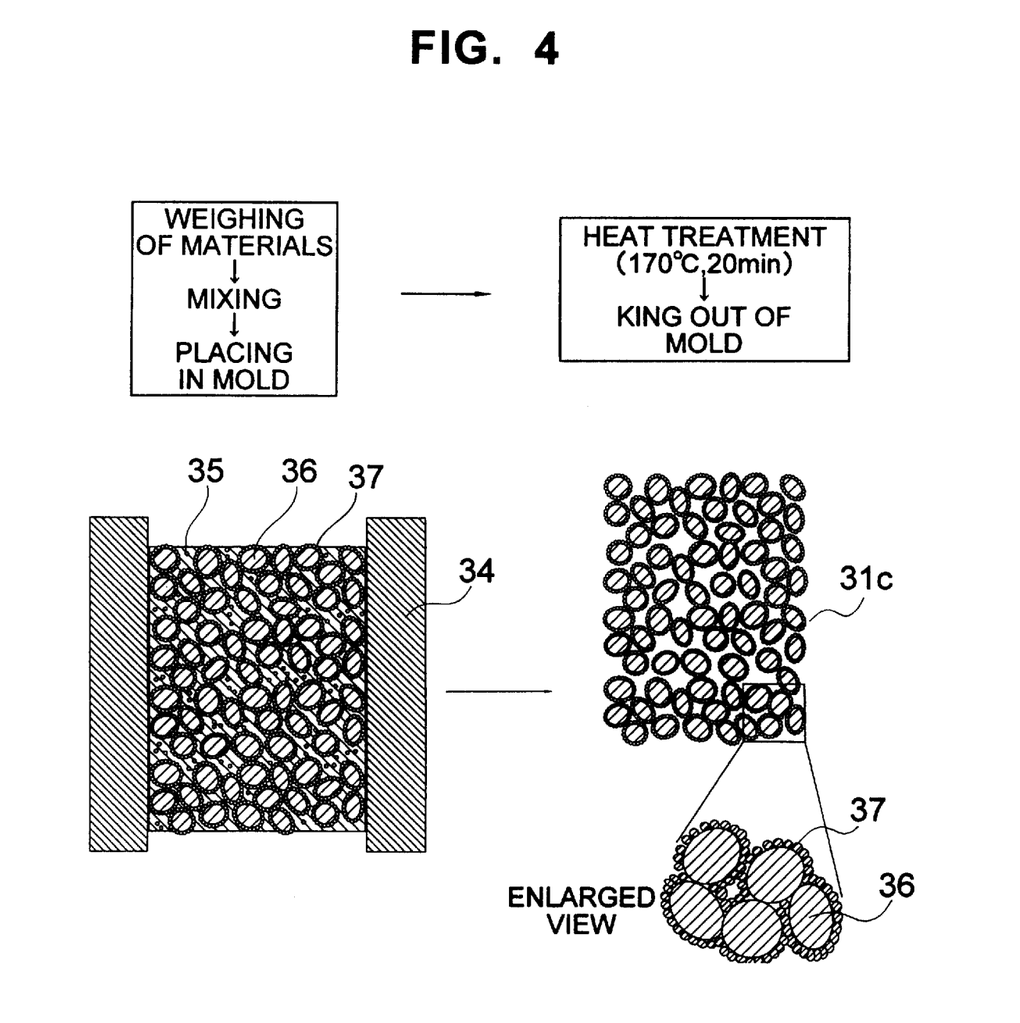
FIG. 4 shows further series of steps for forming a structural element.
Figure 5A:
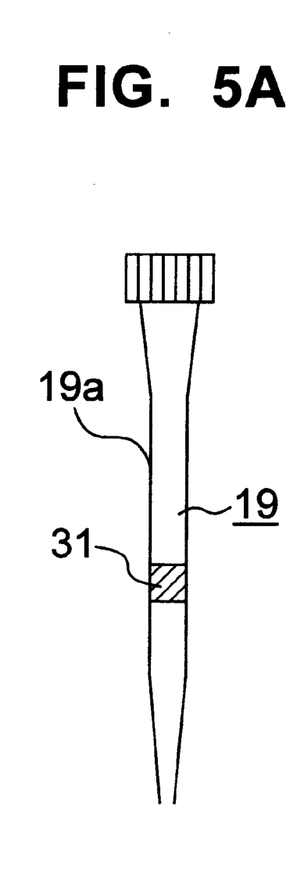
FIGS. 5A to 5D show various modes of tips provided with a structural element therein.
Figure 5B:
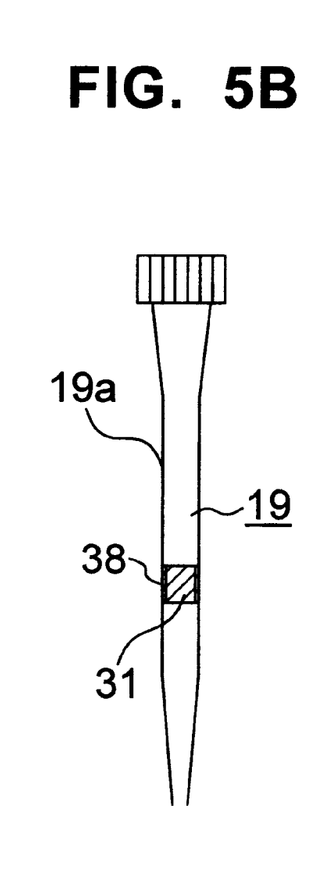
Figure 5C:
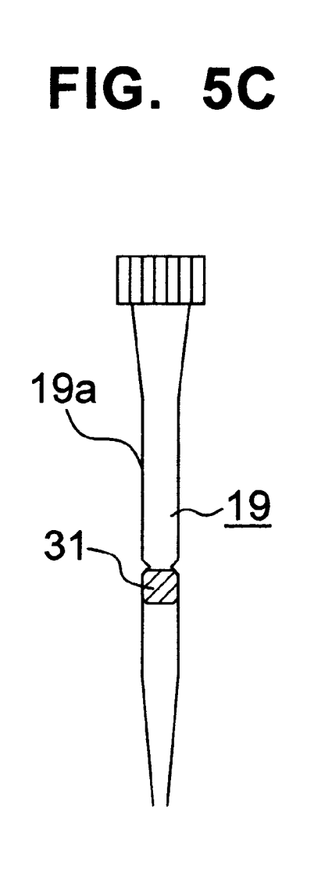
Figure 5D:
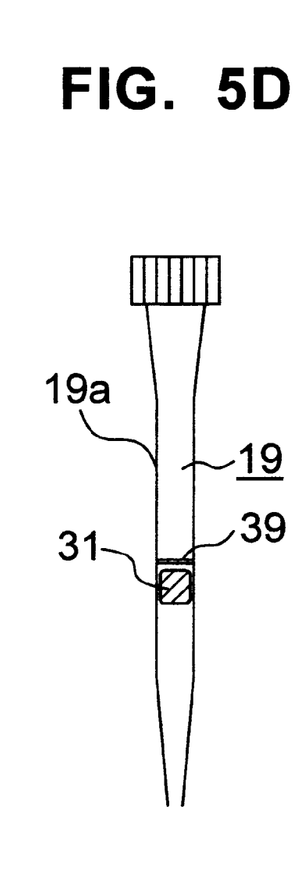

Other process for forming a structural element for trapping nucleic acid according to a third embodiment of the present invention will be described below, referring to FIG. 4.

① Balloon resin particles*[4] and ethanol are weighed out to make a balloon resin particle weight concentration of 10 wt. % on the basis of ethanol and stirred with a spoon. An appropriate amount of a dispersion of microfine $SiO_2$ in ethanol*[5] is added thereto. The mixture is further sufficiently stirred by the spoon and placed into a PTFE mold 34.

② The mixture as in the PTFE mold 34 is heat treated at 170° C. for 20 minutes and the formed product is taken out of the mold 34. Paths are formed by the balloon resin particles 36, and the microfine $SiO_2$ particles 37 as a silicon oxide are deposited on the path surfaces, on which nucleic acid is trapped.

In the foregoing description, *4 is balloon resin particles F-80ED (trademark of a product of polyacrylonitrile (a major component) made by Matsumoto Jushi Seiyaku Co.; average particle size: 80–90 μm) and *5 is dispersion OSCAL (trademark of a product made by Shokubai Kasei Kogyo K.K.; particle size: 40–300 nm). In this process, the balloon resin particles 36 and microfine $SiO_2$ particles are not limited to the foregoing products.

In the present process, an ethyl silicate solution (a sol-gel solution containing a silicon compound) can be also used, but as shown in this Example the balloon resin particles 34 are welded to one another by heat treatment of the balloon resin particles 34 at a temperature a little higher than the heat-resisting temperature thereof e.g. at 170° C.±50° C., whereby a sponge-like formed product can be obtained. At too low a heat treatment temperature such as at 150° C., no welding takes place between the balloon resin particles 34, and consequently the resulting product is not in a formed state, but in a powdery state. At too high a heat treatment temperature such as at 180° C., on the other hand, the balloon resin particles 34 explode and shrink smaller, and no elastic sponge-like formed product can be obtained any more. When the heat treatment time is longer than 1 hour, the balloon resin particle 34 shrink, as in case of the too high heat treatment temperature. In case that the resin particles are not in a balloon form, the particles melt at too high a heat treatment temperature and no paths can be formed therethrough. Thus, the present process requires selection of suitable heat treatment temperature and time for the materials.

In the processes for forming a structural element for trapping nucleic acid in the foregoing Examples 1 to 3, a metal can be used for the mold 34, but there is a possibility of deposition the components of sol-gel solution to the metal surface. Once deposition takes place, the structural element 31 will disintegrate or break, when to be taken out of the mold 34. To use a metallic mold, it is desirable to treat the metal surface with a substance incapable of reacting with the sol-gel solution to prevent the deposition.

EXAMPLE 4

Further process for forming a structural element for trapping nucleic acid according to a fourth embodiment of the present invention will be described below.

① A metallic porous body such as steel wool, etc. made of iron, aluminum, etc. is dipped into an ethyl silicate solution.

② The porous body taken out of the solution is heat treated at a temperature of 100° to 200° C. for 30 minutes to polycondense ethyl silicate, thereby forming a film of silicon alkoxide in the pores of the porous body.

③ If required, these steps are repeated by a plurality of runs.

According to the structural element of this Example, surface area of paths can be increased by using the pores of the porous body and nucleic acid is trapped by the silicon alkoxide in the pores. That is, the silicon alkoxide is used not as a binder, but as a nucleic acid trapping material.

In place of the metallic porous body, the structural element of Example 1 or a mixture of ethyl silicate with silicon oxide, e.g. silica particles, may be used, where the silica particles are used to make the paths rugged, thereby increasing the surface areas of paths, and thus any material can be used, so far as it can make the paths rugged. Alternatively, the metallic porous body can be dipped into a sol-gel solution acting as a binder containing some sort of particles at first, followed by heat treatment, thereby making the pore inside surfaces rugged due to the particles contained in the binder, and then dipped in the ethyl silicate solution, thereby forming the film on the rugged pore inside surfaces.

In this Example, the heat treatment temperature is not particularly limited, so long as it is not more than the heat-resisting temperature of the porous body. At a higher heat treatment temperature, ethyl silicate can be more readily converted to crystalline silica, which is desirable for recovery of nucleic acid.

EXAMPLE 5

Still further process for forming a structural element for trapping nucleic acid according to a fifth embodiment of the present invention will be described below.

Figure 6:
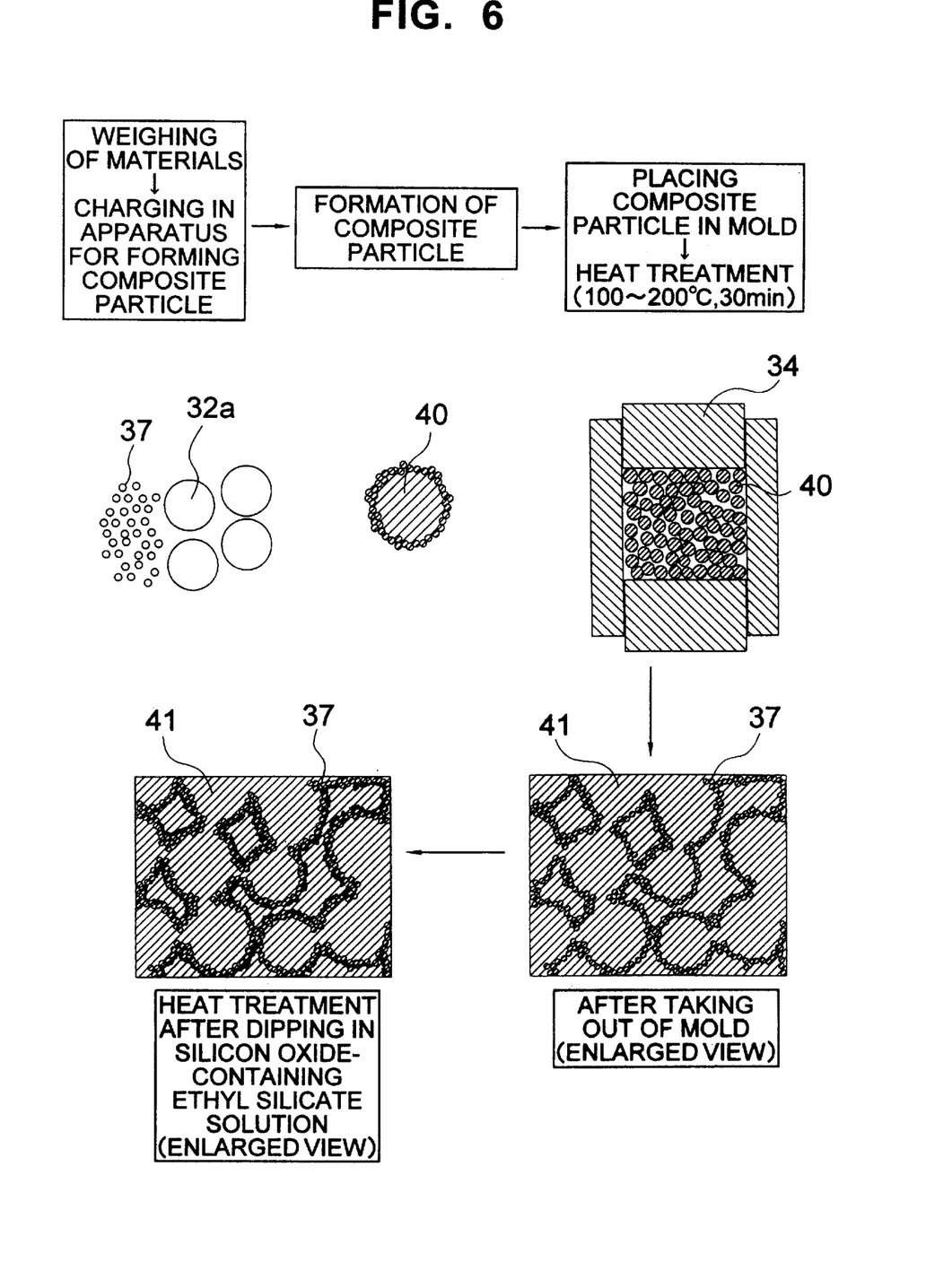
FIG. 6 shows still further series of steps for forming a structural element.

FIG. 6 shows process steps for the formation. Description will be made below, referring to the respective steps.

① Resin particles 32a*[2] and silica particles 37*[6] are weighed out (the amount of silica particle: 0.2–10 wt. % on the basis of the weight of the resin particles), and are subjected to formation of composite particles in an apparatus for forming composite particles.

② A predetermined amount of the resulting composite particles 40 is weighed out and placed into a PTFE mold 34.

③ By The composite particles as in the PTFE mold 34 are heat treated at a temperature of not less than the heat-resisting temperature of the resin particles 32a for about 30 minutes, thereby welding resin particles 32a to one another to obtain interparticulate bonding 41, followed by taking the resulting structural element from the mold.

④ The structural element taken out of the mold is dipped into an ethyl silicate solution*[3] containing monodispersed silica particles 37*[5] and then taken out of the solution.

⑤ The structural element is removed off excess solution by light suction-absorption or by blowing by a blower, etc. and subjected to natural drying or drying at 40°–50° C., followed by heat treatment at 100° C.

⑥ If required, steps ④ and ⑤ are repeated by several runs.

In the foregoing description, *2 is resin particles CL series (trademark of products made by Sumitomo Seika Chemicals Co., Ltd.; particle sizes: 180–1,000 μm), as mentioned before, *6 is flaky silica particles (made by Asahi Glass Co.: average particle size: 4–5 μm; thickness: about 0.05 μm), *5 is monodispersed silica particles in ethanol OSCAL (trademark of a product made by Shokubai Kasei Kogyo K.K.; particle sizes: 40–300 nm), and *3 is an ethyl silicate solution (sol-gel solution containing a silicon compound, i.e. a solution of silicon alkoxide in alcohol, prepared from 25 parts by weight of ethyl silicate, 17.28 parts by weight of water, 0.3 parts by weight of 12 N hydrochloric acid and 5.42 parts by weight of ethanol).

In this process, the silica particles 37 and the resin particles 32a are subjected to mechanical formation of composite particles to form composite particles 40. In this Example, a theta composer (made by Tokuju Kosakusho K.K.) was used to form composite particles. Other means for forming composite particles such as Mechanomill (made by Okada Seiko K.K.), Mechanofusion (made by Hosokawa Micron K.K.), etc. can be used in the present process, and thus the apparatus for forming composite particles is not limited to the apparatuses exemplified in this Example.

The resin particles 32a are softer than the silica particles 37 and thus the silica particles 37 are embedded into the surfaces of resin particles 32a through formation of the composite particles. That is, a film-like matter is formed by silica particles 37, changing the properties of the resin itself. One of such changes is an increase in the apparent heat-resisting temperature, and thus it is desirable to set the heat treatment temperature in the step ③ to higher than the heat-resisting temperature of original resin particles 32a.

According to this process, the formed structural element is dipped into the ethyl silicate solution containing mono-dispersed silica particles 37 to conduct surface treatment of the path surfaces in the structural element, whereby the post-treatment silica particles contained in the ethyl silicate solution are bonded to the silica particles previously embedded in the composite particles by the post-treatment ethyl silicate solution as a binder, thereby strongly bonding the silica particles 37 to the resin particles 32a, and the structural element completely free from peeling of silica particles 37 off the resin particles 32a can be obtained.

By repeating the steps ④ and ⑤ as mentioned in ⑥, the surfaces of the resin particles 32a can be provided with much more silica particles 37, thereby reducing the adverse effect of resin particles 32a on the nucleic acid trapping. To secure a satisfactory liquid flowability therethrough, the silica particles 37 should be provided to such a degree as not to fill clearances formed between the interparticularly welded resin particles.

In this Example, the structural element is formed on the basis of resin particles as nuclei, but can be formed on the basis of silica particles (glass beads) as nuclei. The latter case is effective for recovery of nucleic acid, because the matrix is composed of silicon oxide.

EXAMPLE 6

Still further process for forming a structural element for trapping nucleic acid according to a sixth embodiment of the present invention will be described below.

Figure 7:
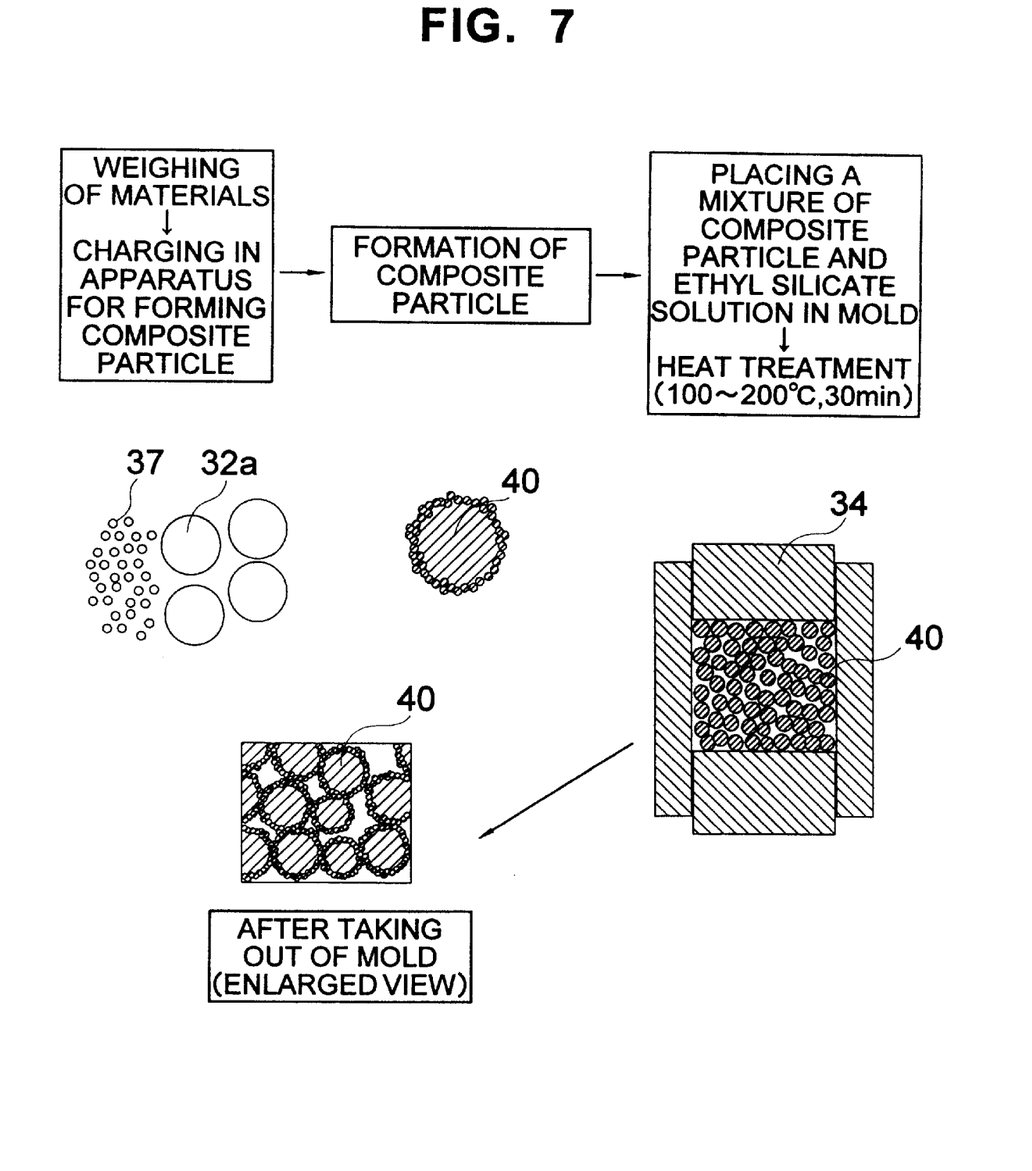
FIG. 7 shows other series of steps for forming a structural element.

FIG. 7 shows process steps for the formation. Description will be made below, referring to the respective steps.

① Resin particles $32a*^2$ and silica particles $37*^1$ are weighed out (the amount of silica particles: 0.2–10 wt. % on the basis of the resin particles), and are subjected to formation of composite particles in an apparatus for forming composite particles.

② A predetermined amount of an ethyl silicate solution is added to the composite particles 40 and the mixture is well stirred and placed into a PTFE mold 34.

③ The mixture as in the PTFE mold 34 is heat treated at 100°–200° C. for 30 minutes to polycondense ethyl silicate in the mold, thereby conducting interparticulate bonding, and then the formed product is taken out of the mold.

In the foregoing description, *1 is silica particles APPROX (trademark of a product made by Sigma Chemical Co.; particle sizes: 8–10 μm).

In the foregoing processes of Examples 5 and 6, the silica particles 37 and the resin particles 32a are not limited to the foregoing products, and the ethyl silicate concentration can be changed. It is desirable that the silicon oxide particles 37 to be used have particle sizes of 0.001 to 100 μm. Below 0.001 μm, the particles are scattered during the weighing, resulting in unstable concentration and also generation of dusts, etc. during the handling as problems. In the formation of composite particles, the particle sizes of the silicon oxide particles are set to not more than 100 μm, because it is said that the particle sizes of particles to be deposited, i.e. silicon oxide particles 37, are preferably not more than the particle sizes of matrix particles, i.e. resin particles 32a. Further, the silicon oxide particles preferably have a particle size of one-tenth of or smaller than that of the resin particles or the organic material.

Ordinary plastic resins can be used for the resin particles 32a, but resins of saturated hydrocarbon series, which are hard to react with nucleic acid or various reagents to be used, for example, polyethylene, polypropylene, etc., or fluorine-based resins such as PTFE are preferable. It is possible to eliminate the adverse effect of matrix by fully depositing silicon oxide onto the resin surface as in Example 5, where the resin particles are not limited to the foregoing resin species.

In Examples 5 and 6, the packing density of particles for the structural element can be increased by carrying out the heat treatment preferably at 105° to 120° C. in the step ③, while pressing the mixture in the mold to keep the structural element in a constant displacement. The porosity of preferably 25 to 30% can be made constant thereby. In that case, with increasing pressing force, the resin particles 32a is inevitably deformed. It is also possible to press the mixture in the mold within the range of elastic deformation of the resin, preferably 0.1 to 0.2 $kg/cm^2$, and keep the mixture in the pressed state for a predetermined time before the heat treatment and, after releasing the mixture from pressing, conduct the heat treatment. In that case, the packing density is lower than that in case of the heat treatment in the pressed state, but the resin particles 32a is not deformed. The heat treatment temperature can be changed, depending upon the species and amount of resin particles to be used, and also the heat treatment time is variable, depending upon the species and the amount of resin particles.

When the sides and the top-bottom of the PTFE mold are independently temperature-controllable during the heat treatment, the temperature of the sides is set to higher than that of the top-bottom, whereby the resin particles on the sides are melted to form smooth surfaces. A problem arising when the structural element is used by sealing it in a tip case is that a liquid sample may pass through the clearance formed between the inside wall of the tip case and the structural element, resulting in less efficient contact of the structural element with the liquid sample. The clearance between the inside wall of the tip case and the structural element can be made smaller by melting the particles only on the mold sides by temperature control of mold, thereby making the side surfaces smooth without any raggedness. The liquid sample can be brought into satisfactory contact with the structural element thereby, and nucleic acid can be recovered more efficiently.

The structural element can be formed by utilizing ultrasonic waves besides the heat treatment. In that case, an ultrasonic wave-generating horn is inserted into the mixture to conduct ultrasonic welding in place of the pin for the PTFE mold. Ultrasonic waves are transferred to the contacts between the particles to elevate the temperature of the contacts to melt the resin, thereby welding the resin particles to one another, where the ultrasonic treatment time can be in a range of a few seconds to several fews of seconds by selecting appropriate frequency and power for the resin.

EXAMPLE 7

A process for producing a tip, using any one of the structural elements formed in Examples 1 to 6 will be described below.

FIGS. 5A to 5D show tips of the present invention.

The structural element 31 so far described in the foregoing Examples 1 to 6 is sealed in a tip case 19a, which refers, for convenience sake, to a tip without the structural element 31 therein (i.e. tip not provided with the structural element 31 therein) to produce the tip 19 of the present invention. The tip can be produced by press inserting the structural element 31 in the tip case 19a. When an adhesive is used to fix the structural element 31 to the tip case 19a, a non-permeable adhesive 38 must be used. In case of using a permeable adhesive, it is difficult to secure paths through the structural element 31 due to permeation of the adhesive into the structural element. Alternatively, after the insertion of the structural element 31 in the tip case 19a, the tip case 19a is deformed to seal the structural element 31 therein, or the structural element 31 can be sealed in the tip case 19a, using a support 39 incapable of interfering with the liquid passage, such as a mesh, a filter, etc.

In any case, it is desirable that the structural element 31 extends all over the radial cross-sectional area of the tip 19 so that a nucleic acid-containing sample liquid can efficiently pass through the structural element 31. To increase the nucleic acid trapping rate, it is possible to insert a plurality of the structural elements 31 in the tip 19.

The tip of the present invention is so simple in the structure that the tip case can be separated from the structural element at the stage of discarding after the use, and can be reused after sterilization.

EXAMPLE 8

Results of tests to confirm nucleic acid trapping with the present tips will be described below.

Tests to confirm nucleic acid trapping were conducted with tips 19 produced by press inserting the structural elements 31 formed in the foregoing Examples 1 to 6 into the corresponding tip cases 19a. Tests were carried out according to the operating procedure of the sample preparation apparatus 1 described before. Then, the resulting sample liquids 13 as samples in the purified product storage vessel 21 were subjected to PCR (polymerase chain reaction) for confirmation, and then to electrophoresis and fluorescent dyeing to evaluate the nucleic acid recovery rate.

Conditions for forming the structural elements 31 in Examples 1, 3, 5 and 6 and the results of nucleic acid recovery are shown in the following Table 1. Substantially same results were obtained as to Examples 2 and 4 and thus are not shown in Table 1.

TABLE 1

| | Materials | Structure | | Nucleic acid recovery rate |
|---|---|---|---|---|
| | | Resin particle size ($\mu$m) | Volume concentration (Vol %) | — |
| Example 1 | Resin particles | 355–425 | 20 | 62 |
| | Silica particles | " | 30 | 58 |
| | Ethyl silicate | 250–355 | 30 | 63 |
| | solution | " | 40 | 59 |
| | | 150–250 | 40 | 65 |
| | | " | 50 | 58 |
| Example 3 | Balloon resin particles | Silica particle size ($\mu$m) | | — |
| | Silica particles solvent | 0.12 | | 52 |
| | | Resin particle size ($\mu$m) | Silica particle size ($\mu$m) | — |
| Example 5 | Resin particles | 500–710 | | 55 |
| | Silica particles | 355–500 | 3.6* | 60 |
| | Ethyl silicate | 250–355 | | 65 |
| | solution | 180–250 | | 71 |
| Example 6 | Resin particles | 500–710 | | 56 |
| | Silica particles | 355–500 | 8–10 | 63 |
| | Ethyl silicate | 250–355 | | 67 |
| | solution | 180–250 | | 80 |

*: subjected to post-treatment

As shown in Table 1, nucleic acid recovery rate of more than 50% could be obtained with all the structural elements, and the recovery rate of more than 70% could be obtained with some structural elements. It was found from the foregoing results that DNA could be simply separated at a high recovery rate with the tip 19 of the present invention.

Figure 8A:
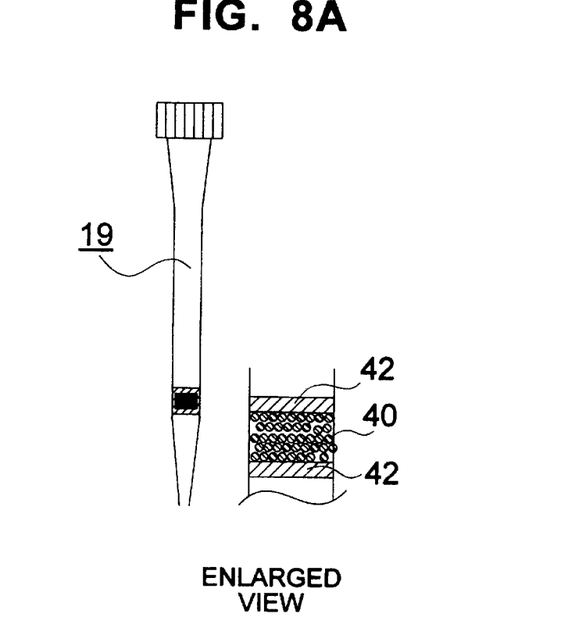
FIG. 8A shows a tip of such a type as to provide composite particles between two filters densely without any free spaces therebetween in the vertical direction, thereby immobilizing the composite particles.

Furthermore, the following tests to confirm the effectiveness of the structural elements so formed were conducted with the following two types of tips using loose composite particles:

One type of tip allowing composite particles to be immobile by packing the composite particles between two filters in the vertical direction without any space, as shown in FIG. 8A.

Figure 8B:
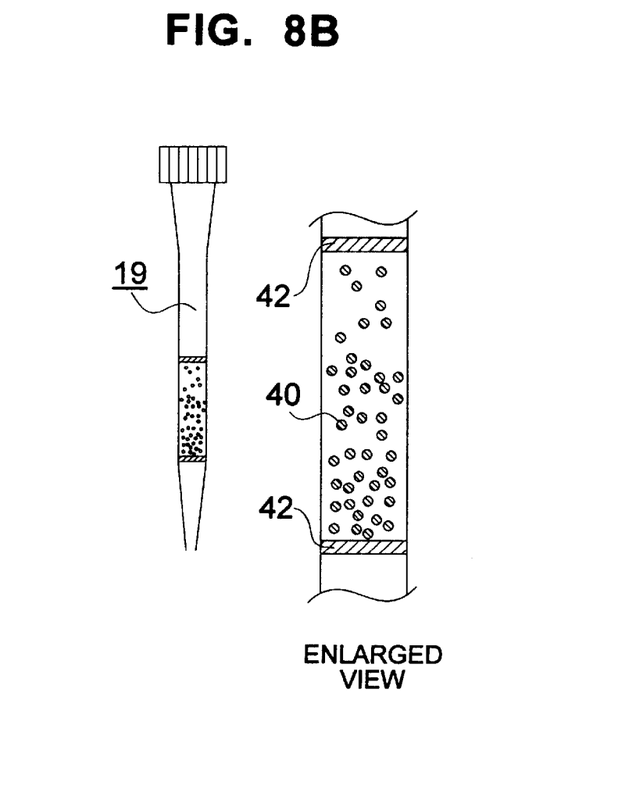
FIG. 8B shows a tip of such a type as to provide composite particles between two filters kept in the vertical direction at a distance wide enough to allow the composite particles to freely move therebetween.

Another type of tip allowing composite particles to freely move between two filters spaced at a given distance in the vertical direction by providing composite particles therebetween, as shown in FIG. 8B.

Tests to trap nucleic acid were conducted with these two types of tips according to the same operating procedure as above. It was found from the result that there were no remarkable difference in the recovery rate of nucleic acid from sample liquids having a high nucleic acid concentration therebetween, but the former type of tip is better than the latter type of tip in the recovery rate of nucleic acid from sample liquids having a low nucleic acid concentration. That is, the former type of tip allowing the sample liquid to pass through small and narrow clearances between the composite particles has a higher contact frequency of silica with nucleic acid at such a low nucleic acid concentration as a small absolute amount of nucleic acid, that is, a better nucleic acid recovery rate than those of the latter type of tip allowing the composite particles to move freely. It can be seen from the foregoing results that the structural element composed of immobilized composite particles, which allows a liquid to pass through the clearances therebetween, as in the present invention, is effective for nucleic acid recovery. In case of loose composite particles, it is necessary for recovery of the particles to use a magnetic force or a centrifugal separation with the result of a difficult problem of apparatus construction, whereas the present invention is based on the structural element without any problem of particle recovery.

As described above, it was confirmed that nucleic acid could be simply separated at a high recovery rate with the tip 19 provided with the present structural element 31 therein, and that a higher recovery rate can be obtained when the resin particles 32 as matrix particles have smaller particle sizes, that is, larger surface areas.

The present structural element can simply pass a sample liquid therethrough without any vacuum suction or pressurizing. Nucleic acid-adsorbable silicon oxide are provided in a rugged state on the surfaces of paths for a sample liquid and thus nucleic acid can be separated from the sample liquid at a high recovery rate without any defects such as braking, etc. and the necessary amount of the liquid sample can be minimized because of the high recovery rate.

What is claimed is:

1. A tip, which comprises a structural element for separating nucleic acid from a sample liquid, the structural element being formed from composite particles comprising resin particles as nuclei and particles of silicon oxide deposited on the surfaces of the resin particles by three-dimentionally bonding the composite particles to one another, being provided in the passage for the sample liquid in the chip.

2. A tip according to claim 1, wherein the resin particles have particle sizes of 50 to 1,000 $\mu$m.

3. A tip, which comprises a structural element for separating nucleic acid from a sample liquid, the structural element being formed from composite particles comprising nucleus particles and particles of silicon oxide deposited on the surfaces of nucleus particles by three-dimension ally bonding the composite particles to one another.

4. A structural element, for trapping nucleic acid from a sample liquid by passing the sample liquid there-through, which is formed from composite particles comprising resin particles as nuclei and particles of silicon oxide deposited on the surfaces of the resin particles by three-dimensionally bonding the composite particles to one another.

5. A structural element according to claim 4, wherein the resin particles have particle sizes of 50 to 1,000 $\mu$m.

* * * * *

(12) EX PARTE REEXAMINATION CERTIFICATE (9554th)
United States Patent
Ikeda et al.

(10) Number: US 6,162,356 C1
(45) Certificate Issued: Mar. 12, 2013

(54) CHIP FOR USE IN NUCLEIC ACID SEPARATION, STRUCTURAL ELEMENT AND PROCESS FOR FORMING THE STRUCTURAL ELEMENT

(75) Inventors: Yukiko Ikeda, Ibaraki-ken (JP); Yoshishige Endo, Tsuchiura (JP); Yasuhiro Yoshimura, Ibaraki-ken (JP); Takao Terayama, Ushiku (JP); Kenji Yasuda, Tokyo (JP); Toshinari Sakurai, Hitachinaka (JP); Tetsuo Yokoyama, Tokyo (JP); Takanori Aono, Ibaraki-ken (JP)

(73) Assignee: Hitachi, Ltd., Chiyoda-ku, Tokyo (JP)

Reexamination Request:
No. 90/020,007, Jun. 28, 2012

Reexamination Certificate for:
Patent No.: 6,162,356
Issued: Dec. 19, 2000
Appl. No.: 09/272,353
Filed: Mar. 19, 1999

(30) Foreign Application Priority Data

Mar. 19, 1998 (JP) ..................... 10-069787

(51) Int. Cl.
*B01D 15/08* (2006.01)
*C03C 11/00* (2006.01)
*C07H 1/08* (2006.01)
*C07H 1/00* (2006.01)

(52) U.S. Cl. ................ 210/198.2; 210/502.1; 210/510.1

(58) Field of Classification Search .................... None
See application file for complete search history.

(56) References Cited

To view the complete listing of prior art documents cited during the proceeding for Reexamination Control Number 90/020,007, please refer to the USPTO's public Patent Application Information Retrieval (PAIR) system under the Display References tab.

*Primary Examiner* — Norca L Torres Velazquez (57) ABSTRACT

Composite particles formed from resin particles and silica particles (amount of silica particles: 0.2 to 10 wt. % on the basis of the resin particles) in an apparatus for formation of composite particles are placed in a PTFE mold and heat treated to weld the resin particles to one another, thereby forming a structural element, which is dipped in an ethyl silicate solution containing monodispersed silica particles, then taken out of the solution and subjected to further heat treatment to form an ultimate structural element, which is sealed in a tip case, whereby a tip can be produced at a low cost and used to separate nucleic acid from a liquid sample for a short time at a high recovery rate without any defects such as breaking, etc.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

\* \* \* \* \*